(12) United States Patent
Cooper

(10) Patent No.: US 6,215,962 B1
(45) Date of Patent: Apr. 10, 2001

(54) ILLUMINATION DETECTING CAMERA

(75) Inventor: Ted J. Cooper, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/290,507

(22) Filed: Apr. 12, 1999

(51) Int. Cl.[7] .................................................. G03B 7/00
(52) U.S. Cl. ................................................................ 396/225
(58) Field of Search ....................................... 396/213, 225

(56) References Cited

U.S. PATENT DOCUMENTS

| | | | |
|---|---|---|---|
| 4,079,388 | * 3/1978 | Takahama et al. .................. | 396/225 |
| 4,653,925 | 3/1987 | Thornton, Jr. ........................ | 356/419 |
| 4,896,965 | 1/1990 | Goff et al. ............................ | 356/417 |
| 5,500,709 | * 3/1996 | Kazami et al. ....................... | 396/225 |
| 5,568,267 | 10/1996 | Sunamori et al. .................... | 356/307 |
| 5,710,948 | * 1/1998 | Takagi .................................. | 396/225 |
| 5,799,216 | * 8/1998 | Teremy et al. ....................... | 396/225 |

* cited by examiner

*Primary Examiner*—W. B. Perkey
(74) *Attorney, Agent, or Firm*—Mikio Ishimaru

(57) ABSTRACT

A camera is provided which has an optical sensor which can respond to natural, artificial light, and a combination by bandpass filtering or spectrum diffraction and electronic processing to allow compensation for color differences in an image taken by the camera caused by the illumination.

20 Claims, 2 Drawing Sheets

ILLUMINATION DETECTING CAMERA

CROSS-REFERENCE TO RELATED APPLICATIONS

The present application contains subject matter related to a concurrently filed U.S. Patent Applications by Theodore Cooper entitled "OPTICAL SENSOR FOR ILLUMINATION MIXTURES AND METHOD FOR THE DESIGN THEREOF". The related application is assigned to the same assignees as the present application, is identified by docket numbers 1014-001, and is hereby incorporated by reference.

The present application also contains subject matter related to concurrently filed U.S. Patent Applications by Theodore Cooper entitled "SCANNING AND PRINTING SYSTEMS WITH COLOR DISCRIMINATION", and "COLOR CORRECTING AND AMBIENT LIGHT RESPONSIVE CRT SYSTEM". The related applications are assigned to the same assignees as the present application and are identified by as docket numbers 1014-003 and 1014-004, respectively.

1. Technical Field

The present invention relates generally to cameras and more particularly to cameras capable taking pictures, which can be compensated for different illuminants to provide natural looking pictures.

2. Background Art

Human vision is a very poorly understood mechanism that translates photons of various wavelengths into visual pictures that our brains can understand and respond to. The human vision system compensates for scenes under various illumination sources and provides to the viewer a "corrected" visual picture. For example, white tee-shirts appear white in human vision regardless of whether the scene happened under noonday sunlight or in the last minutes a red sunset. When digital cameras, either video motion cameras (VMC) or a digital still camera (DSC), are exposed to similar illumination environments, the resulting images are profoundly different.

Extensive research has been undertaken to predict a mathematical construct for an image called the White Point (WP). The WP is the illumination that occurred at the brightest point in the image and represents what should be considered "white" in the final image. It is assumed that every image has some white objects or highlights in it. When the brightest object, with roughly equal amounts of red, green, and blue is found, the WP operation is constructed by determining the multipliers of the red, green, and blue parts of the brightest point so that the resulting red, green, and blue values will be made equal. Once this transformation is known for the brightest point in an image, it is simultaneously applied to all the other points (which are called pixels) in the image. The WP operation typically results in a final image that looks much more realistic with respect to its color balance.

There is a significant shortcoming of the simplistic WP operation described above. It is the assumption that there are some spectrally "white" objects in the image. While this is true the majority of the time for typical "tourist" pictures, there are also numerous cases where a spectrally "white" object is not present, for example, a close-up picture of a red barn with some blue and green metal signs attached to the barn's side. The dominant color would be red. Some digital camera systems might interpret the large amount of red as a color cast problem that typically occurs under sunset illumination conditions. The brightest part of the image would be the green signs. If the digital camera algorithm attempted to use the green area as the WP, then the resulting picture would be made very blue. The underlying problem is caused by not knowing the true nature of the illumination (light source) present at the time the image was captured.

Current technology tries to use the color content of the image to estimate the color illumination. In video motion cameras (VMCs), there has been remarkable success with this method since the videographer typically "pans" a scene to cover a large area. In this process, there is almost always some bright white object that can be identified in the multiple images. Once this "brightest" object is imaged, the WP algorithm locks in on this area and makes an estimate of the white point illumination and keeps this WP value until a "brighter" white object is discovered. This is not true for digital still cameras (DSCs) where typically only a single image is capture for a given scene.

A great deal of research is being conducted to see if the WP of an image can be deduced from just the image itself. However, examples like the barn picture described above will always cause problems. An alternative solution is to measure the scene's illumination source directly. In black and white photography, the measurement was performned with a "light meter". The meter is pointed at the light source which would be straight up for daylight or towards a spotlight if it were focused on object of interest. In color photography, a more sophisticated type of "light meter" called a photo spectroradiometer is used. Rather than measuring a single quantity like the black and white light meter, a photo spectroradiometer has to measure numerous points across the visual light spectrum and make a graph of the power at each wavelength that it has found. Once this graph is known, then an accurate representation of the original image can be constructed by removing the influence of the light source from the original scene. For example, an image of a white tee-shirt at sunset will have a definite red cast to it. The photo spectroradiometer graph will show strong photon power in the red region of the visible spectrum. Knowing how much influence the illumination source had on the resulting image, a mathematical process is performed to remove the dominant red from the image. The final image has the white tee-shirt looking truly white. In the other example of the red barn with the blue and green signs, the photo spectroradiometer graph would show normal daylight present as the illuminant. This means that almost no color correction would be applied to the final image. So in this case the dominant red barn color would be left in the image since that is the normal color that human vision would have seen under midday circumstances. The photo spectroradiometer is the ideal instrument for taking color pictures.

The problem is that a spectroradiometer is both big and expensive. A typical unit is 10 by 6 by 4 inches in size and costs between $5000 to $50,000 in 1998 dollars. It also requires a computer to readout its graphical data and apply it to the image in question. What has long been needed is a low-cost, small, portable spectroradiometer to indicate the type of illumination present while a picture is being captured.

DISCLOSURE OF THE INVENTION

The present invention relates to a camera having an optical sensor which can respond to natural, artificial light, and a combination thereof to allow compensation for color differences in an image taken by the camera caused by the illumination.

The present invention further provides a camera having an optical sensor system which uses a diffraction grating and a plurality of photodiodes to determine the proportions of sunlight and artificial light to allow compensation for color differences in an image taken by the camera caused by the illumination.

The present invention further provides a camera having an optical sensor system in which a plurality of bandpass filters and photodiodes are used to determine the proportions of sunlight and artificial light to allow compensation for color differences in an image taken by the camera caused by the illumination.

The present invention further provides a digital still camera (DSC) recording an image on a matrix of photosensitive elements which are used for determining the illumination which allows for compensation of color differences caused by the illumination.

The present invention further provides a camera having an optical sensor system which can be used to record illumination data on film to be used during the development process thereof.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
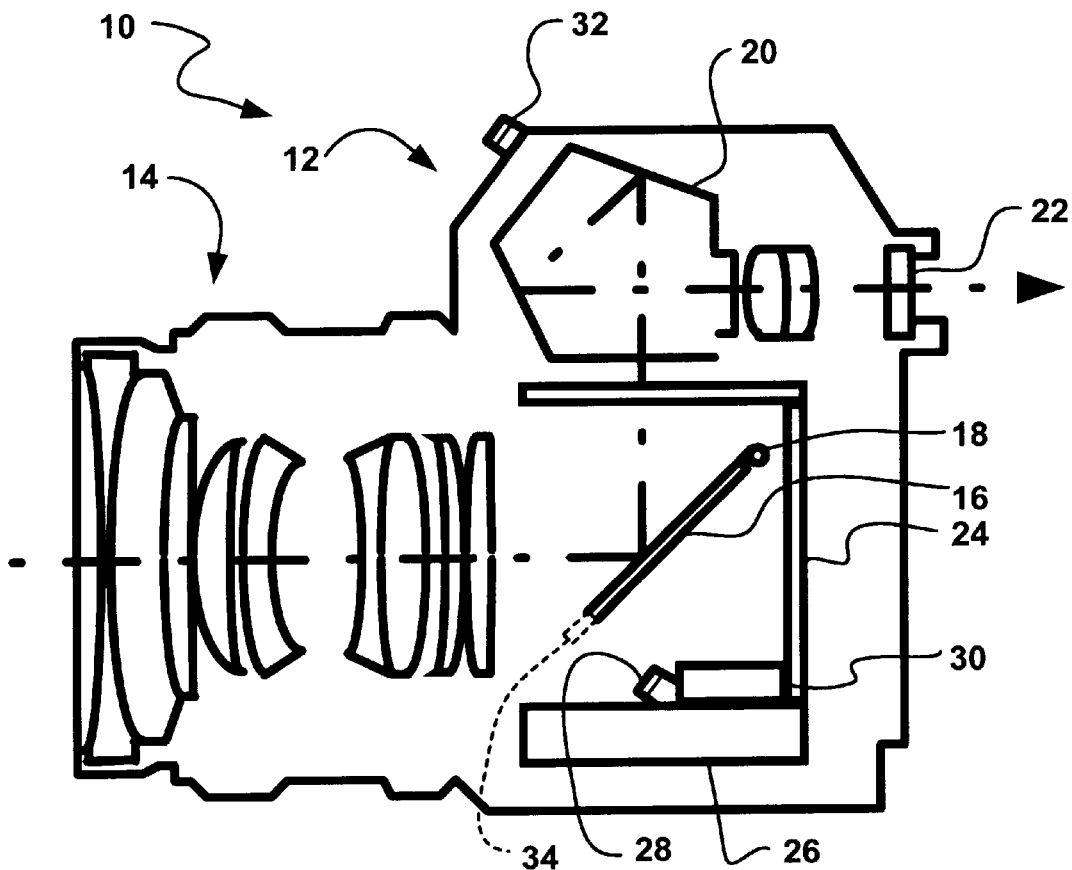
FIG. 1 is a cross sectional view of a single lens reflex camera incorporating the present invention.

Referring now to FIG. 1, therein is shown a single lens reflex camera 10 having a camera body 12 and an attached lens system 14. A single lens reflex camera is shown as an example where the present invention fits in well, but it would be evident that the present invention would work for all cameras. Further, the present invention could be used with different recording media such as film and magnetic recording as will later be explained.

The camera 10 has a mirror 16 which pivots on a pivot 18 to initially direct light both from an image as well as ambient light through the lens system 14 up to a prism 20 and out through an eyepiece 22.

When a picture is being taken, the mirror 16 is pivoted up so as to allow light to strike a recording medium 24. For a film camera, the recording medium is photographic film, which is designated as film recording medium 24. In a digital still camera (DSC), the recording medium 24 initially is a matrix of photosensors, such as photosensitive semiconductors, photodiodes, or charge-coupled devices. The image recorded initially by these photosensors is then electronically or magnetically recorded digitally for later playback. This medium is designated as digital recording medium 24.

The camera 10 also contains a plurality of photodiodes 110, directed at the sweet spot of the image coming through the lens system 14, which can provide illumination information through a recording mechanism 30 to the recording medium 24. The photodiodes 110 are a category of photosensors which either produce or allow the passage of current in response to light energy being applied to them. The photodiodes 110 could also be a small subset of the photosensors in the digital recording medium 24.

The camera body 12 further has an exterior photodiode 32 on top of the camera 10 pointed generally away from the image which will be in the picture. To provide even better discrimination of the illumination, the exterior photodiode 32 may be pivotable by the user to point at the illumination which provides the highest light energy.

In an alternate embodiment, a diffraction grating 34 is provided at the end of the mirror 16 to diffract entering light into its corresponding spectrum for the plurality of photodiodes 110. As will later be described, two types of optical sensor systems are within the scope of the present invention.

Figure 2:
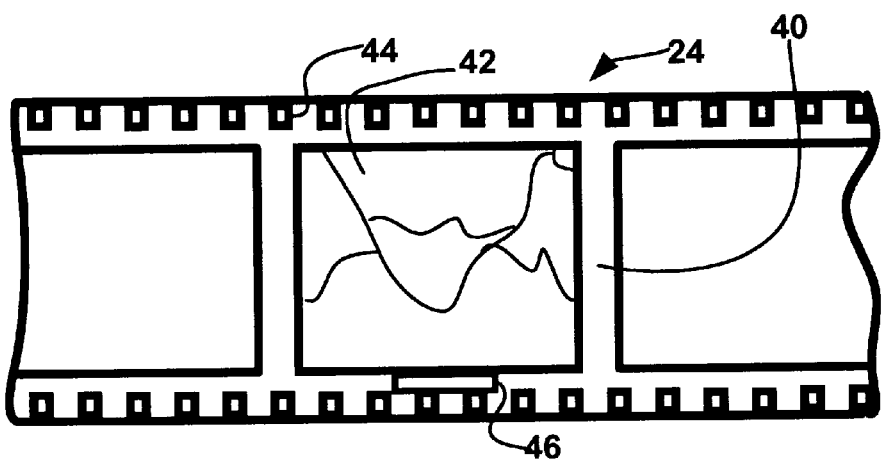
FIG. 2 is a piece of film used with the camera of the present invention.

Referring now to FIG. 2, therein is shown a portion of the film recording medium 24 having sprockets 44 and a black ring 40 around the picture 42 onto which the recording mechanism 30 can provide data regarding the illumination to which the film is exposed. This illuminant information can be recorded in an information area 46 in the black ring 40 and be used by the developer in the film laboratory to correct ambient illumination induced color shifts in the image by determining the white point, as previously explained.

Figure 3:
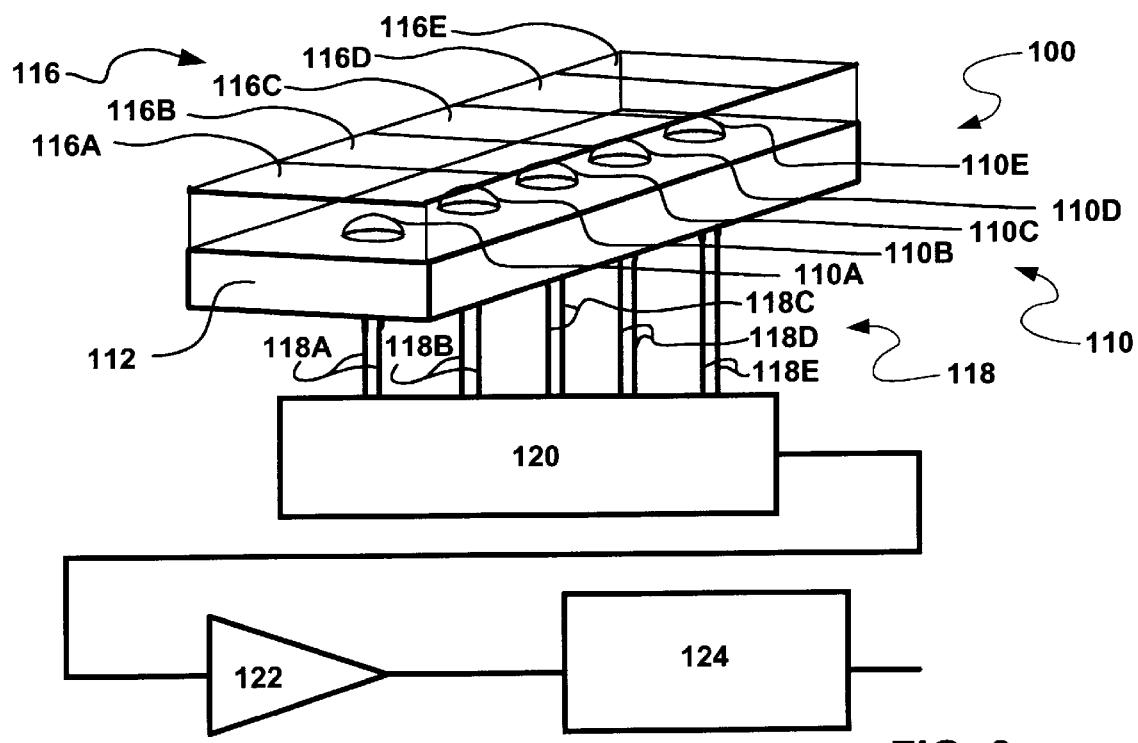
FIG. 3 is an isometric illustration of the bandpass filter optical sensor system of the present invention.

Referring now to FIG. 3, therein is shown an optical sensor system 100. The optical sensor system 100 contains a plurality of photodiodes 110. The photodiodes 110 are secured to a mounting block 112 which is covered by a clear, optically transparent resin 114. The resin 114 is provided with a flat surface on which a plurality of bandpass filters 116 are disposed.

In the preferred embodiment, the bandpass filters 116 are dyes which are in the form of an ink, paint or gel which can be printed, painted, or silk-screened on the resin 114. The dye material can further be placed in several layers for increased optical density. The different bandpass filters 116 allow the combination to be able to discriminate between different portions of the spectrum of light falling on the bandpass filters 116. With the proper selection of bandpass filters, it is possible to distinguish the particular portions of the spectrum which contain particular intensities which are characteristic of various types of natural and artificial light.

The particular bandpass filter dyes selected and the number of photodiodes in the plurality of photodiodes is determined so as to integrate the signals that are derived from the plurality of photodiodes 110 with their respective bandpass filters 116 in response to various mixtures of illumination. In the present invention five photodiodes 110 A through E are shown with their accompanying bandpass filters 116 A through E.

The outputs from the plurality of photodiodes 110 are connected by a plurality of leads 118 to a multiplexer or sample-and-hold circuitry 120. The analog signals from the sample-and-hold circuitry 120 are provided to an analog-to-digital converter 122 which provides digital signals to an application specific integrated circuit (ASIC) 124 which could be a modified version of a conventional integrated circuit used as part of the camera 10 or an independent ASIC. The ASIC 124 would compare the signals from the plurality of photodiodes 110 and provide information as to how the picture taken by the camera 10 should be changed to compensate for differences caused by various mixtures of illuminants. Further, by comparing the strengths of the output signals, a determination can be made of the relative strengths or percentages of the various illuminants. In the preferred embodiment, only the relative strengths of two or possibly three illuminants is necessary to compensate a picture.

Figure 4:
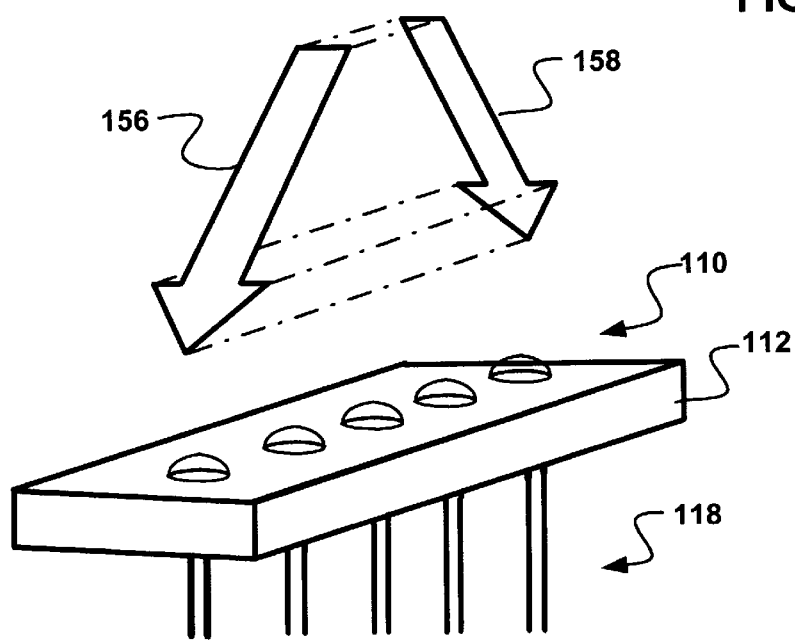
FIG. 4 is an isometric illustration diffraction grating optical sensor system of the present invention.

Referring now to FIG. 4, therein is shown an alternative optical sensor system 150 having photodiodes 110 mounted in a block 112. Spaced away from the block 112 is a diffraction grating 152. The diffraction grating 152 diffracts the entering light spectrum 154 containing the light from the various illuminants into its spectral components, represented by spectral components 156 and 158. In this alternate embodiment, for example, the spectral component 156 would be in the red light region and would illuminate the first of the photodiodes 110 while the spectral component 158 would be in blue light region and would illuminate the furthest photodiode 110. Starting with the five pairs of leads 118, the remaining electronics would be the same as for the optical sensor system 100.

In operation, light from the image would enter the camera 10 through the lens system 14 and be reflected by the mirror 16 which would be in the down position. The light would be reflected upwards into the prism 20 and be reflected through the prism 20 to exit out the eyepiece 22 where the user could see the exact image seen by the lens system 14.

In the preferred embodiment, the light from the image would be sensed by the photodiodes 110 which is integrated in the camera 10. The photodiodes 110 would be positioned to receive light from the center of the image area. The spectrum of light from the image would fall on the top of the bandpass filters 116A through 116E.

The various spectrum segments passed by the bandpass filters 116A through 116E will provide different intensities of light at different regions of the spectrum on the photodiodes 110A through 110E depending upon the light illuminating the image. With proper selection of the bandpass filters 116, light can be identified as coming from natural and artificial sources, such as the following without being limiting:

early morning sun, mid-morning sun, late afternoon sun, cloud-covered sun, tungsten incandescent, halogen incandescent, standard warm white fluorescent, white fluorescent, standard cool white fluorescent, daylight fluorescent, neon, xenon flash, combinations of the above.

The outputs from the photodiodes 110A through E are provided to the sample-and-hold 120 which sequentially provides the signals to the analog-to-digital converter 122. The analog-to-digital converter 122 provides the digital signals to the ASIC 124 of the camera 10.

The ASIC 124 then provides the information as to the type of illuminants to the recording mechanism 30 which provides the information to the recording media 24. For a DSC camera, the information would be recorded in the digital recording medium 24 and for a film camera it would actually be recorded in the black ring around the picture 42 in the information area 46 of the film recording medium 24.

In an alternate embodiment, the optical sensor system 150 as shown in FIG. 4 has the diffraction grating 152 which breaks up the image and illuminant light, designated as the light 154, into its spectral components 156 and 158 which is spread across the plurality of photodiodes 110. The outputs of the photodiodes 110 then act in the same form as previously described for the optical sensor system 100. While the diffraction grating could be placed on a transparent resin, generally the diffraction grating 152 must be spaced away from the photodiodes 110, further than the bandpass filters must, in order to cover the spectrum from 400 to 700 nanometers.

Depending on the colorimetric properties of the camera 10 and its intended use, it may be necessary to measure the illuminant in a direction other than through the camera's lens from the image. In this situation, it may be necessary to use another non-integrated discrimination sensor, such as the photodiode 32, to provide another input to the ASIC 124. The photodiode 32 would be directed away from the image area, and generally upward to assist in determining the white point. The weighting to the various optical sensor systems would be heuristically determined.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A camera having an optical sensor system comprising:

a plurality of photosensitive elements for providing a plurality of outputs proportional to the light energy applied thereto;

a plurality of bandpass filters for said plurality of photosensitive elements, said plurality of bandpass filters having discrimination ability for portions of the spectrum of illumination selected from a group consisting of natural light, artificial light, and a combination thereof; and a processing system connected to said plurality of photosensitive elements and responsive to said plurality of outputs to determine the presence of light energy attributable to illumination from the natural light, the artificial light, and the combination thereof, said processing system including a mechanism for providing information to allow compensation for color differences in an image taken by the camera caused by the illumination.

2. The camera as claimed in claim 1 wherein:

each of said plurality of bandpass filters is associated with one of said plurality of photosensitive elements to determine the proportions of natural light and artificial light.

3. The camera as claimed in claim 2 including:

a matrix of photosensitive elements for detecting a plurality of colors and intensities of an image taken by the camera and providing an output representative thereof, said matrix of photosensitive elements including said plurality of photosensitive elements;

said processing system including electronics connected to said matrix of photosensitive elements and photosensitive elements for adjusting said output representative of said intensity based on said information to allow compensation for color differences caused by the illumination and providing a recordable output; and recording media connected to said processing system for recording the recordable output containing the image taken by the camera which has been adjusted to compensate for color differences caused by the illumination.

4. The camera as claimed in claim 3 wherein:

said processing system including further circuitry connected to said matrix of photo-sensitive elements for adjusting said outputs representative of said intensities based on said information to allow compensation for color differences caused by the illumination by determining the white point for the image and providing a recordable output representative thereof.

5. The camera as claimed in claim 4 wherein:

said plurality of photosensitive elements is positioned to receive light energy from a portion of the image; and a non-image photosensitive element positionable in a plurality of positions to receive light energy away from the image and for providing an output proportional to the light energy applied thereto.

6. The camera as claimed in claim 5 wherein:

said plurality of photosensitive elements is positioned to receive light energy from the center of the image; and said non-image photosensitive element is positionable to receive light energy from the strongest light energy source.

7. The camera as claimed in claim 2 including:

a matrix of photosensitive elements for detecting a plurality of colors and intensities of an image taken by the camera and providing an output representative thereof, said matrix of photosensitive elements including said plurality of photosensitive elements;

said processing system including electronics connected to said matrix of photosensitive elements and photosensitive elements for adjusting said output representative of said intensity based on said information to allow compensation for color differences caused by the illumination and providing a recordable output;

a transport mechanism capable of containing photographic film; and a recording mechanism for recording the information to allow compensation for color differences in an image taken by a camera caused by the illumination along with each of the images on the photographic film.

8. The camera as claimed in claim 7 wherein:

said plurality of photodiodes is positioned to receive light energy from a portion of the image;

a non-image photosensitive element positionable in a plurality of positions to receive light away from the image and for providing an output proportional to the light energy applied thereto;

said processing system includes a mechanism responsive to said output of said non-image photosensitive element to provide information of the illumination; and said recording mechanism includes a further mechanism for recording the information of the illumination from said non-image photosensitive element on the photographic film.

9. The camera as claimed in claim 8 including:

said matrix of photosensitive elements is selected from a group of components consisting of photosensitive semiconductors and charge-coupled devices;

said photosensitive elements are selected from a group of components consisting of photosensitive semiconductors and charge-coupled devices.

10. The camera as claimed in claim 9 including:

a transparent material disposed over said photosensitive elements to form a flat surface; and each of said plurality of bandpass filters including a dye disposed on said flat surface.

11. A camera having an optical sensor system comprising:

a plurality of photodiodes for providing a plurality of outputs proportional to the light energy applied thereto;

a plurality of bandpass filters for said plurality of photodiodes, said plurality of bandpass filters having discrimination ability for portions of the spectra of illumination selected from a group of illuminants consisting of:

daylight, afternoon light, fluorescent, incandescent, photoflash, and a combination thereof; and a processing system responsive to said outputs to determine the presence of light energy attributable to illumination from the illuminants:

daylight, afternoon light, fluorescent, incandescent, photoflash, and combination thereof.

12. The camera as claimed in claim 11 wherein:

each of said plurality of bandpass filters is associated with one of said plurality of photodiodes and is capable of discriminating among the illuminants.

13. The camera as claimed in claim 12 including:

a matrix of photosensitive elements for detecting a plurality of colors and intensities of an image taken by the camera and providing an output representative thereof, said matrix of photosensitive elements including said plurality of photodiodes;

said processing system including electronics connected to said matrix of photosensitive elements and photodiodes for adjusting said output representative of said intensity based on said information to allow compensation for color differences caused by the illuminants and providing a recordable output; and recording media connected to said processing system for recording the recordable output containing the image taken by the camera which has been adjusted to compensate for color differences caused by the illumination.

14. The camera as claimed in claim 13 wherein:

said processing system including further circuitry connected to said matrix of photo-sensitive elements for adjusting said outputs representative of said intensities based on said information to allow compensation for color differences caused by the illumination by determining the white point for the image and providing a recordable output representative thereof.

15. The camera as claimed in claim 14 wherein:

said plurality of photodiodes is positioned to receive light energy from a portion of the image; and a non-image photodiode positionable in a plurality of positions to receive light energy away from the image and for providing an output proportional to the light energy applied thereto.

16. The camera as claimed in claim 15 wherein:

said plurality of photodiodes is positioned to receive light energy from the center of the image; and said non-image photodiode is positioned to receive light energy from above the image.

17. The camera as claimed in claim 12 including:

a matrix of photosensitive elements for detecting a plurality of colors and intensities of an image taken by the camera and providing an output representative thereof, said matrix of photosensitive elements including said plurality of photosensitive elements;

said processing system including, electronics connected to said matrix of photosensitive elements and photosensitive elements for adjusting said output representative of said intensity based on said information to allow compensation for color differences caused by the illumination and providing a recordable output;

a transport mechanism capable of containing photographic film; and a recording mechanism for recording the information to allow compensation for color differences in an image taken by a camera caused by the illumination along with each of the images on the photographic film.

18. The camera as claimed in claim 17 wherein:

said plurality of photodiodes is positioned to receive light energy from a portion of the image;

said non-image photodiode positionable in a plurality of positions to receive light away from the image and for providing an output proportional to the light energy applied thereto;

said processing system includes a mechanism responsive to said output of said non-image photodiode to provide information of the illumination; and said recording mechanism includes a further mechanism for recording the information of the illumination from said non-image photodiode on the photographic film.

19. The camera as claimed in claim 18 including:

said matrix of photosensitive elements is selected from a group of components consisting of photosensitive semiconductors and charge-coupled devices;

said photodiodes are selected from a group of components consisting of photodiodes, photosensitive semiconductors, and charge-coupled devices.

20. The camera as claimed in claim 19 including:

a transparent resin disposed over said photodiodes to form a flat surface; and each of said plurality of bandpass filter is a dye disposed on said flat surface by a process selected from a group consisting of silk-screening, printing, or a combination thereof in a form selected from a group consisting of paint, gel, and a combination thereof.

* * * * *

UNITED STATES PATENT AND TRADEMARK OFFICE
CERTIFICATE OF CORRECTION

PATENT NO. : 6,215,962 B1
DATED : April 10, 2001
INVENTOR(S) : Cooper

Page 1 of 1

It is certified that error appears in the above-identified patent and that said Letters Patent is hereby corrected as shown below:

Column 3,
Line 64, delete "110" insert -- 28 --
Line 67, delete "110" insert -- 28 --

Column 4,
Line 3, delete "110" insert -- 28 --
Line 14, delete "110" insert -- 28 --

Signed and Sealed this

Twenty-third Day of October, 2001

Attest:

*Nicholas P. Godici*

Attesting Officer

NICHOLAS P. GODICI
*Acting Director of the United States Patent and Trademark Office*